Fig. 1.

INVENTORS
JAMES B. LINDSAY
WILLIAM T. ENGEL
GEORGE D. BRENT
BY Norman N Holland
ATTORNEY April 28, 1970

J. B. LINDSAY ET AL 3,509,309

AUTOMATIC STUD WELDER

Filed Dec. 13, 1966

INVENTORS.
JAMES B. LINDSAY
WILLIAM T. ENGEL
GEORGE D. BRENT

BY

ATTORNEY

Fig. 3.

INVENTORS.
JAMES B. LINDSAY
WILLIAM T. ENGEL
GEORGE D. BRENT
BY Norman M. Hallard
ATTORNEY April 28, 1970   J. B. LINDSAY ET AL   3,509,309
AUTOMATIC STUD WELDER
Filed Dec. 13, 1966   12 Sheets-Sheet 4

Fig. 4.

INVENTORS.
JAMES B. LINDSAY
WILLIAM T. ENGEL
BY GEORGE D. BRENT
ATTORNEY

United States Patent Office 3,509,309
Patented Apr. 28, 1970

3,509,309
AUTOMATIC STUD WELDER
James B. Lindsay, Millburn, William T. Engel, Union, and George D. Brent, North Caldwell, N.J., assignors to Kahle Engineering Co., Union City, N.J., a corporation of New Jersey
Filed Dec. 13, 1966, Ser. No. 601,459
Int. Cl. B23k 9/22
U.S. Cl. 219—95                                7 Claims

ABSTRACT OF THE DISCLOSURE

A machine is disclosed for automatically welding two small metal parts together such as components for electronic devices including a short lead wire and a more rigid slug or cap member, or the like. The machine includes an upstanding operating head which mounts a spool of wire and which feeds the wire vertically downwardly towards a small horizontal dial mounted on the machine base. This dial has a series of small chucks at its periphery which receive the more rigid members such as the caps and which feed them to a welding position at the lower end of the downwardly feed wire. The machine cuts an end piece from the wire and moves the cut piece into engagement with the cap at the welding station and percussively welds the pieces together. The dial and chuck as well as the wire feed operate at high speeds and suitable welding currents are obtained by a multiple capacitor system which successively charges a series of capacitors and which switches them one at a time into the welding circuit.

---

The present invention relates to a method of automatically welding small metal objects and more particularly to an improved method and apparatus for attaching a short length of wire or other preformed part to another preformed metal slug or cap or similar item. In the electronic manufacturing industry there is a large and increasing demand for relatively small elements which include a pair of attached metal components such as two-piece component lead wires which comprise a short wire and another more rigid slug or cap member welded to one end of the wire. Various machines and methods have been used in forming such two-piece elements and a preferred attaching method is a welding process known as percussive welding.

In the percussive welding operation, the pointed element has its point moved sharply into contact with the second element while the two elements are coupled across a source of welding current. As soon as the point is moved close to or against the second element, the current discharge is established and this blows away the point portion of the pointed member forming a gap with an arc across it. The arc which melts adjacent portions of the two elements and the continuing movement of the two elements toward one another forms the percussive weld.

The present invention provides a method and means for using this known percussive welding method in attaching relatively fine short lengths of wire or other preformed parts to a variety of support or secondary members at extremely high speeds.

A problem inherent in such an operation is the handling of both the short wire element or other pointed member and the secondary rod, cap, or other element as it is necessary to present both of these small elements to the welding station in precise positions and to simultaneously control the physical impact and pulse of welding current.

In accordance with a preferred embodiment of the present machine and method, the wire is advanced to the welding point in the form of a continuous length of spool fed wire which is straightened, cut at an angle and coupled to the welding current while the rod or cap elements are simultaneously advanced to the welding station by means of an intermittently rotated dial which presents them at the proper position and at the proper time to be engaged and fused with the wire element.

In addition to precision positioning ability, the method and machine of the invention are adaptable for varying wire diameters and lengths as well as for varying shapes and sizes of other elements.

Accordingly, an object of the present invention is to provide an improved method and means of welding small elements together percussively.

Another object of the present invention is to provide a high-speed method and means for welding a short length of wire to a secondary element.

Another object of the present invention is to provide a high-speed welding machine for small objects capable of attaching short lengths of wire of varying diameters to another pre-cut wire or a variety of differently shaped secondary elements.

Another object of the present invention is to provide an improved percussive welding machine for forming a variety of two component lead wires or similar elements formed of two attached members.

Other and further objects of the invention will be obvious upon an understanding of the illustrative embodiment about to be described or will be indicated in the appended claims and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIGS. 5 and 6 are vertical sectional views of the wire feeding and cutting means taken along lines 5—5 and 6—6 on FIG. 3;

GENERAL DESCRIPTION

Figure 1:
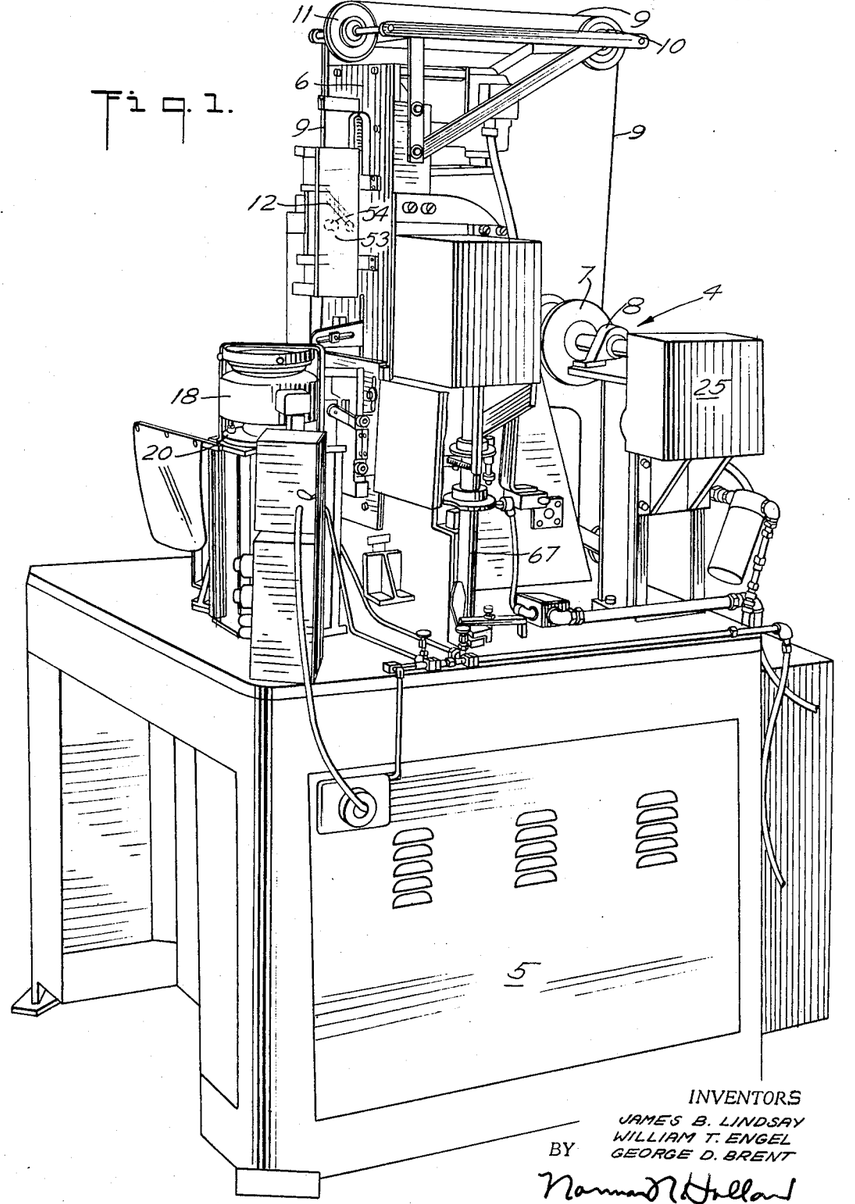
FIG. 1 is a perspective view illustrating a preferred embodiment of the machine of the invention for carrying out the improved method.
Figures 8, 24, 25:
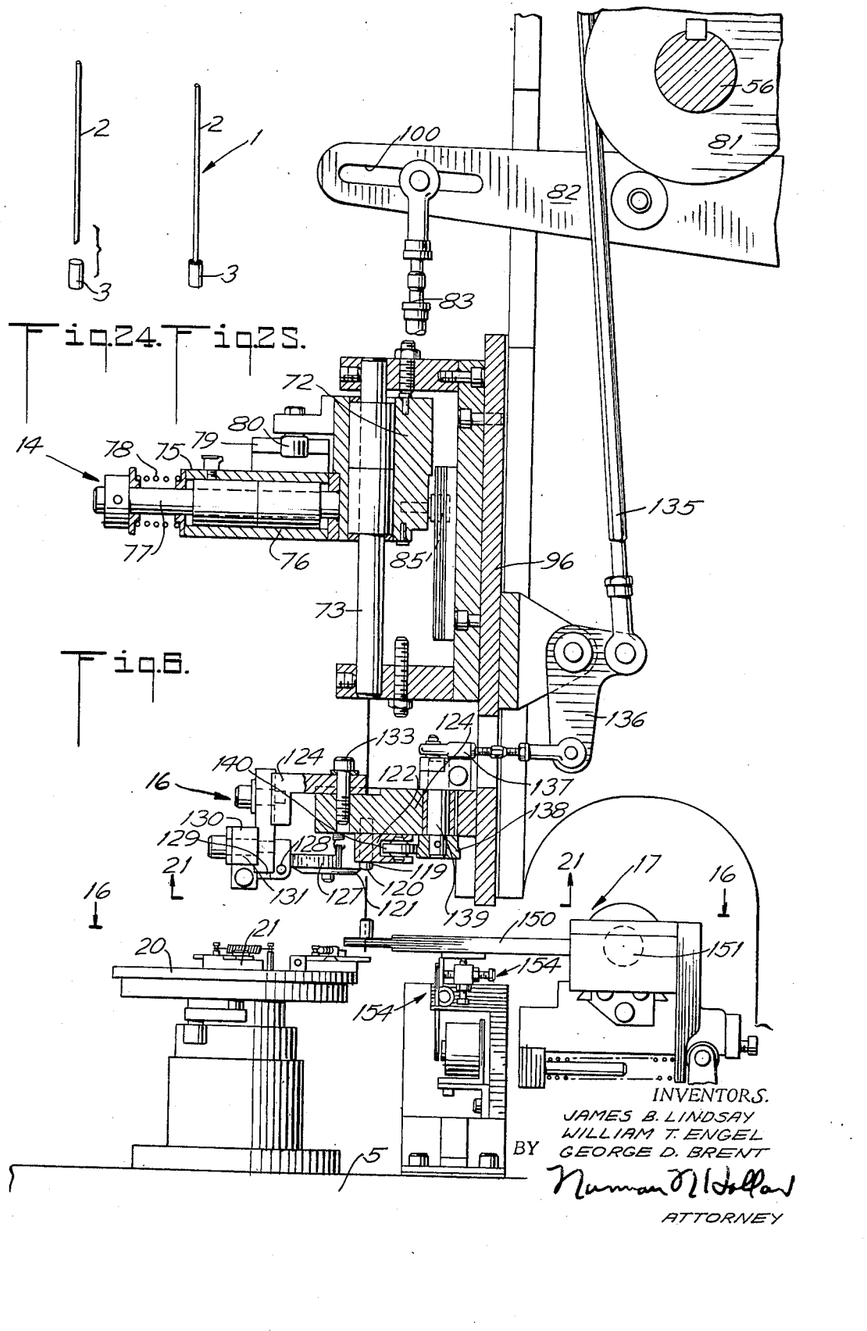
FIG. 8 is a vertical sectional view of the machine base illustrating the drive system and the lower cam shaft.
FIGS. 24 and 25 are enlarged perspective views illustrating a typical wire and slug element as welded on the machine and in their unwelded and welded conditions respectively.

The machine and method in accordance with the present invention will first be described generally in its simplest form with particular reference to FIGS. 1 and 2, and certain other figures where particularly designated, in forming a two-piece lead wire 1 consisting of a short length of molybdenum or tungsten wire 2 and a supporting rod or slug 3 as illustrated in FIGS. 24 and 25. The welding machine 4 as illustrated in FIG. 1 includes a supporting base 5 which houses a power drive means for the various assembly elements which are mounted on an upstanding operating head 6. As indicated, the machine 4 is used to attach a short length of wire 2 to a support element 3 by a percussive welding operation. The wire 2 for this assembly is provided in spool form and a spool 7 of the wire is rotatably mounted on the back of the machine head 6 on a spool support 8 and with a feed control further described below. A length of wire 9 from the spool 7 is fed over the top of the machine head 6 on suitable guide pulleys 10 and 11 to a wire straightening device 12 which functions to straighten the wire 9 preparatory to its being cut and welded to the slug 3 or other element.

Figure 2:
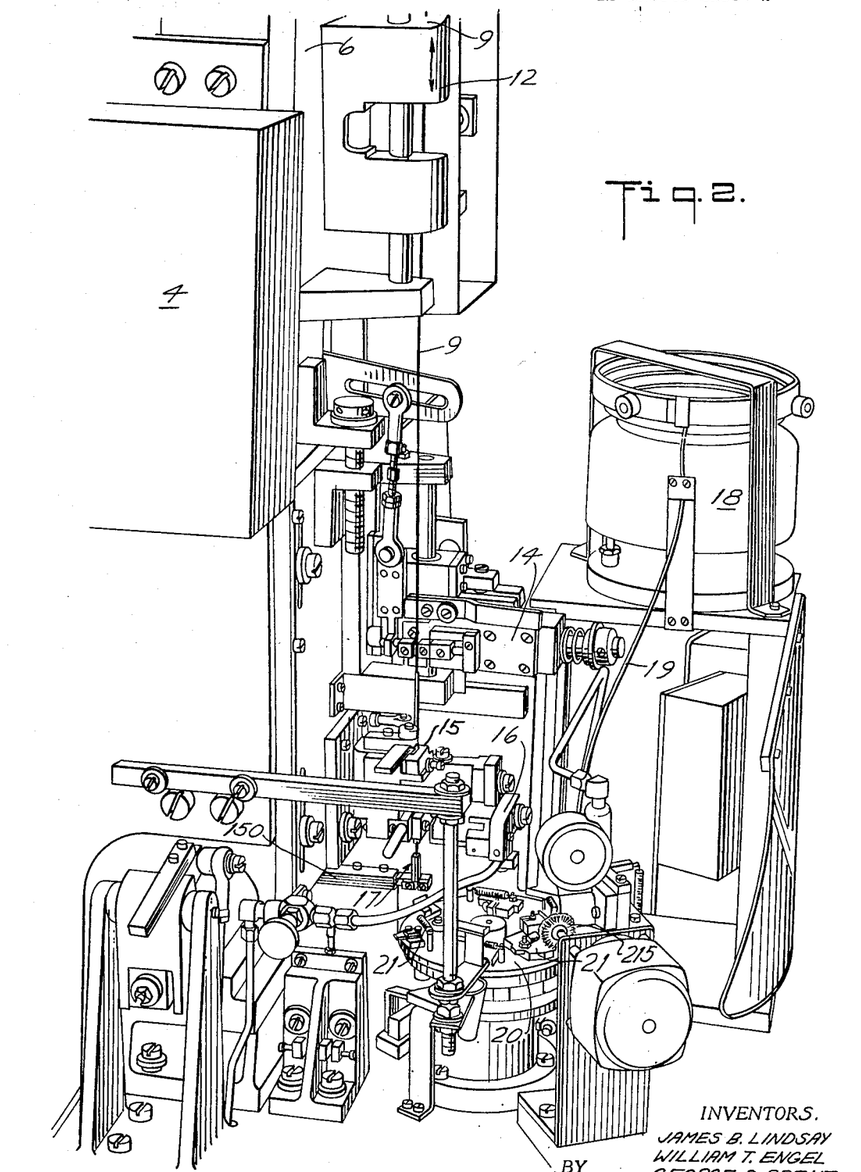
FIG. 2 is an enlarged fragmentary perspective view illustrating the wire feeding means and the welding station.

FIG. 2 illustrates the wire 9 leaving the wire straightener 12 and being fed vertically downwardly by wire feeder 14 and past a clamp 15 to a knife 16 which cuts the wire lengths 2 at a predetermined angle. At a welder 17, the cut wire 2 is attached to the support element such as the rod-like element or slug 3 illustrated in FIG. 24 or a cap or other element. The slugs 3 are stored in a typical feed hopper 18 of the type commercially available and which generally operate on a vibrating principle to feed the small slug 3 or other elements in a properly oriented position out of an exit at the top of the hopper 18 so that the elements slide down an inclined feed tube 19 to the feed dial 20 as illustrated at the lower portion of FIG. 2. The feed dial 20 includes a series of support chucks 21 each of which are adjustable to receive a slug 3 or other element. The dial 20 is intermittently rotated in a synchronized fashion with the wire feeder 14 and the welder 17 to present one slug 3 at a time to the welder 17. As the dial 20 feeds the slugs 3 to the welder 17, the wire 9 is being intermittently advanced by the wire feeder 14 and is being cut into lengths 2. At the welder 17, the welding current is passed between the short length of wire 2 and the slug 3 as the wire length 2 strikes against the slug 3 under the control of the impact portions of the welder 17. The completed element 1, consisting of the wire 2 and the slug 3 is then advanced by the intermittently rotating dial 20 to a discharge station where the completed element 1 is removed from the chuck 21.

The operation of the several devices described briefly above and their coordinated action for providing the improved impact welding will now be described in greater detail with particular reference to the detailed drawings of the various portions of the machine.

WIRE SUPPLY AND FEED SYSTEMS

The system for supplying the wire 9 to the cutter 16 and welder 17 will now be described with particular reference to FIGS. 1 and 7. FIG. 1 illustrates the welding machine 4 showing the vertical head 6 and also illustrates the supply spool 7 for the wire 9 mounted at the rear of the head 6 and supplying the wire 9 which is directed upwardly and over the top of the machine head 6 on guide pulleys 10 and 11 towards the wire straightener 12 and the wire feeder 14 mounted on the front of the head 6 and above the welder 17.

Figure 7:
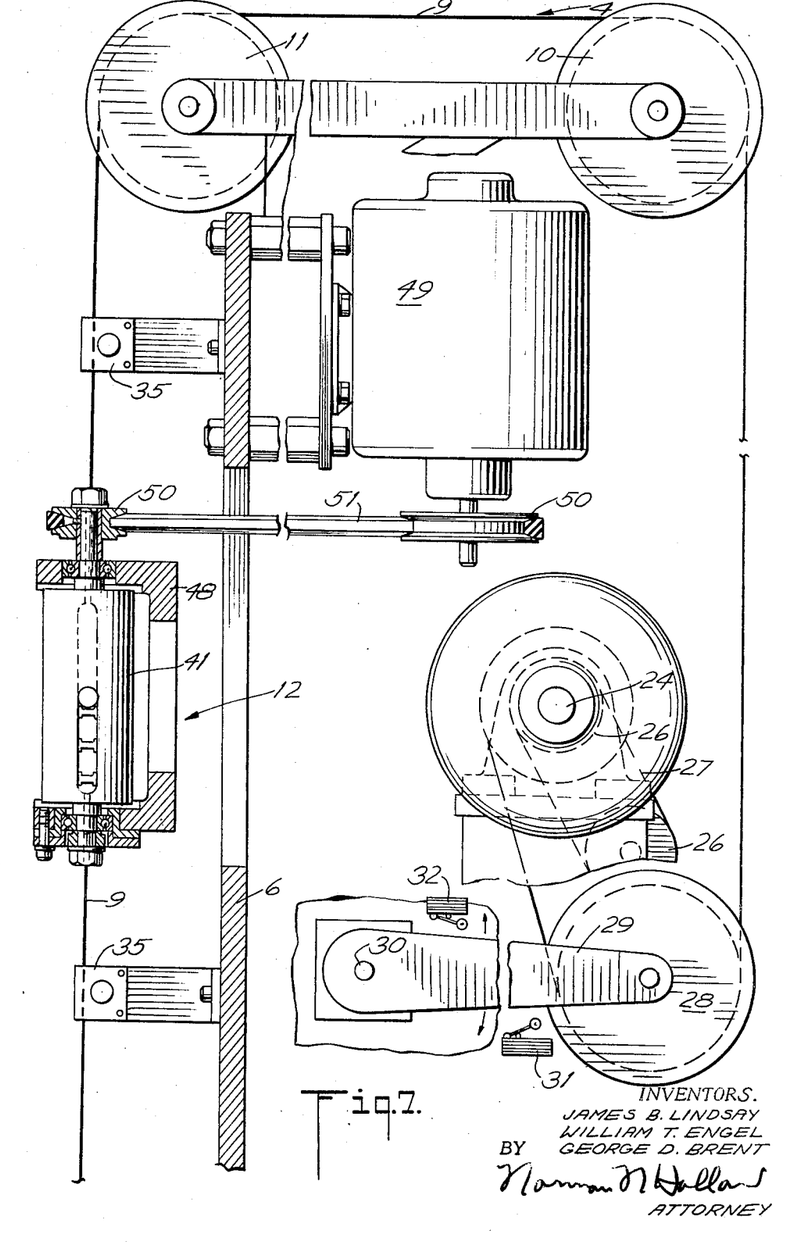
FIG. 7 is a vertical sectional view of the wire supply means and straightener taken along line 7—7 on FIG. 4.

FIG. 7 illustrates the spool mounting 8 and the drive system in greater detail showing the wire 9 passing over the guide pulleys 10 and 11 on the machine head 6 and downwardly into the wire straightener 12. The wire spool 7 is rotatably mounted on a horizontal support shaft 24. In order to facilitate the feeding of the wire 9, a drive system is provided to slowly rotate the wire spool 7 at a speed slightly in excess of the wire 9 feed speed. This drive is provided by a drive motor and speed reducer system 25 (FIG. 1) and which is coupled by sprockets 26 and chain 27 to the wire spool shaft 24. As indicated, the spool 7 is driven at a slightly higher speed than is necessary to provide the proper supply of wire 9 and an overfeed of the wire is prevented for by a control system for cutting off the motor system 25 under the control of a pivotally mounted wire guide pulley 28. As illustrated in FIG. 7, the guide pulley 28 is supported on a mounting arm 29 pivotally attached at 30 to the machine head 6. This permits the pulley 28 to swing downwardly as the supply of guide wire 9 at the rear of the machine head 6 increases. A microswitch 31 is provided in position to be activated when the pulley mounting arm 29 drops to a predetermined level and this microswitch 31 is included in the control for motor system 25 so that the motor is cut off for a short period and as the arm 29 is lifted by the shortening length of lead wire 9. A time delay may control the motor restart or a second microswitch 32 may be used which is engaged by the raised arm 29.

FIG. 7 illustrates the wire 9 passing over the upper guide pulleys 10 and 11 and then through the wire straightener 12 between a pair of spaced tension blocks 35. These tension blocks 35 which are shown in detail at the bottom of FIG. 4 include a mounting arm 36 which holds leather gripping pads 37 against the wire 9 under the force of the adjustably tensioned compression spring 38.

Figure 4:
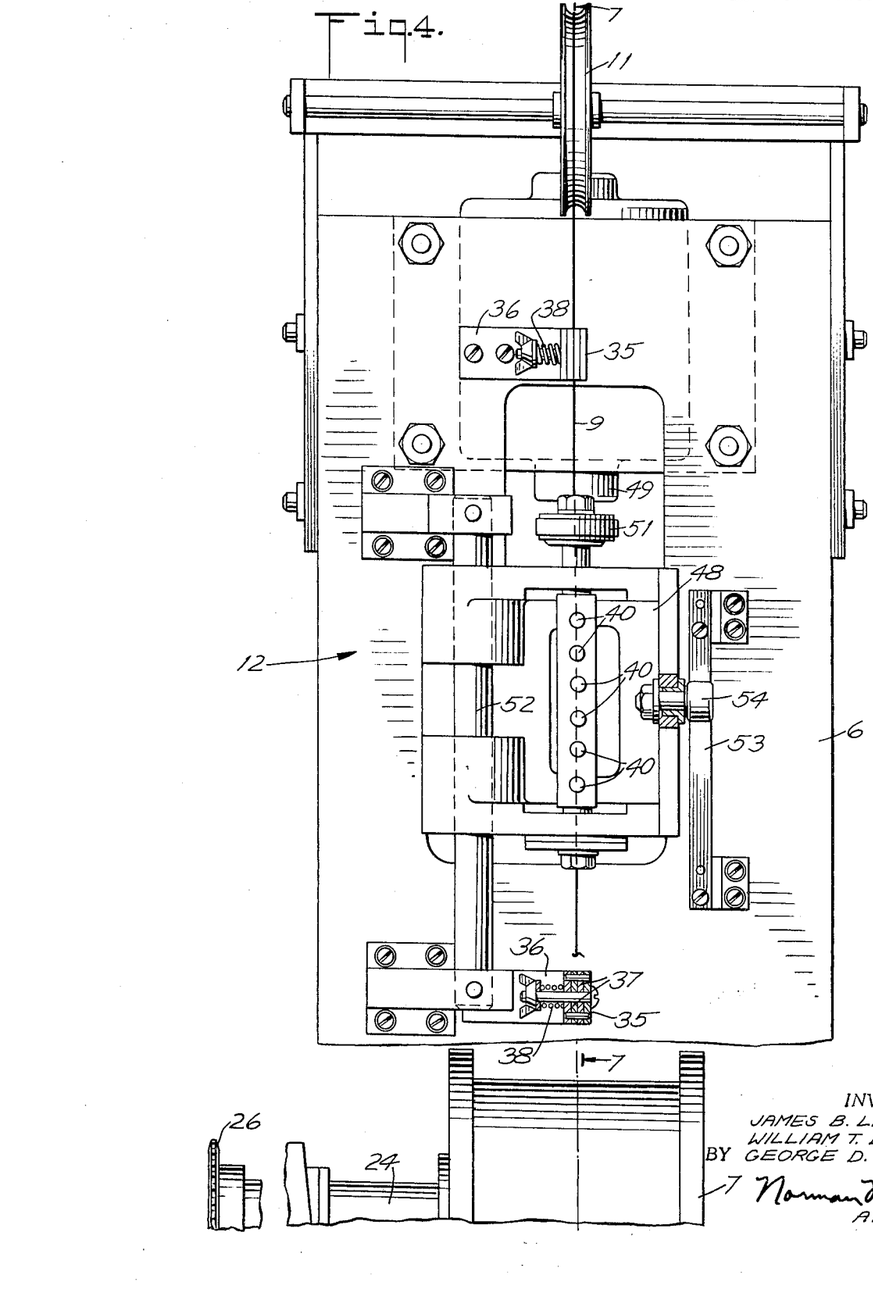
FIG. 4 is a detailed front elevational view of the wire straightener.

The straightener 12 is illustrated in FIGS. 4 and 7. The straightening action of the wire straightener is provided by a reciprocating movement of the straightener 12 axially of the wire 9 and an accompanying rotary motion of the straightener 12 which provides a continuing and temporary zigzag deformation of the wire 9 passing through the straightener 12 through the action of the group of offset spaced and rotating dies 40. A group of these dies 40 such as the six dies 40 illustrated in FIG. 4, are mounted in a rotating support block 41 which provides for a continuous rotation of the dies 40 around the wire 9 by drive motor 49 and belt 51 as the wire 9 moves past the dies 40. Center holes for passing the wire 9 are provided in each die 40 and the successive holes are spaced laterally of the normal center line of the wire 9 a slight amount and in successively opposite directions so that the wire 9 being drawn through the six dies 40 has a zigzag shape varied by the rotation of the offset dies 40 at about 6,000 r.p.m. or higher.

The reciprocating movement of the wire straightener 12 is provided by mounting the frame 48 on a vertical slide rod 52 on one side and by controlling the frame position by a cam 53 and roller 54 connected to its opposite side (FIGS. 1 and 4). The drive for the reciprocal movement is obtained from a cam 55 (FIG. 3) mounted on an upper cam shaft 56 in the head 6 and which is coupled to the straightener frame 48 through the intermediation of a suitable cam follower and connecting lever (not shown).

Figure 3:
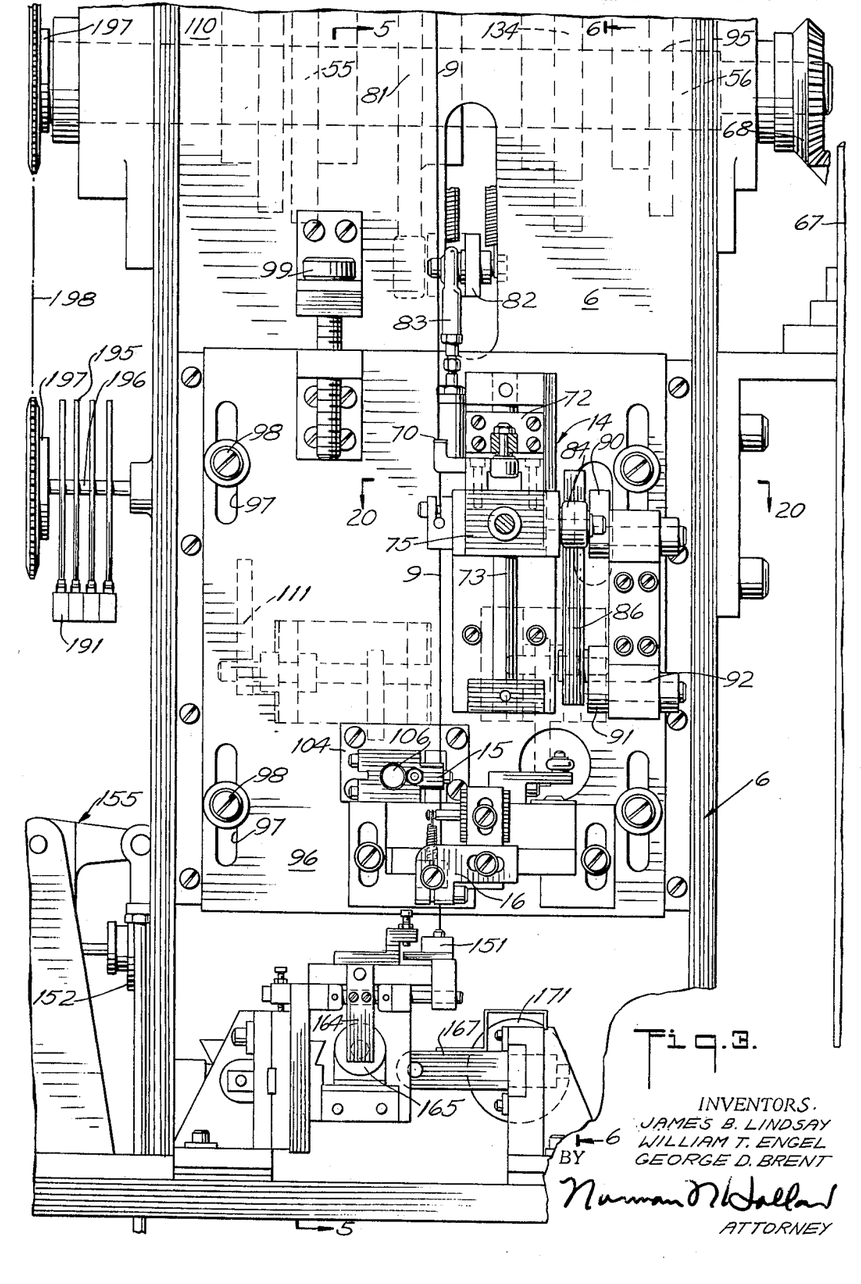
FIG. 3 is a detailed front elevational view of the wire feeding and cutting means.

The upper cam shaft 56 is positively coupled to the machine drive system so that it rotates in synchronism with the drive system including a lower cam shaft 60 (FIG. 8) and the drive for the dial 20. The principal portions of the drive system are illustrated in FIG. 8 including a drive motor and speed reducer 62 coupled to the lower cam shaft 60 by sprockets 63 and 64 and the notched drive belt 65. The lower cam shaft 60 drives the above mentioned upper cam shaft 56 through a geared coupling including bevel gears 66 (FIG. 8) and vertical drive shaft 67 and bevel gears 68 (FIG. 3).

THE WIRE FEED DRIVE

The wire feed drive which intermittently advances the wire 9 towards the welder 17 is mounted on head 6 below the wire straightener 12 as illustrated generally at 14 in FIG. 2 and as shown in greater detail in FIGS. 3, 5, and 6 as well as sectional view 20.

In general, the wire feed 14 comprises a pair of jaws 70 (FIG. 20) which are reciprocated vertically and axially of the wire 9 so that they are closed during their downward movement to advance the wire 9 downwardly a predetermined increment and so that they are open on their return or upward movement.

A stationary jaw mount 71 extends outwardly from the wire feed carriage 72 which is slidably mounted on a vertical support shaft 73 and which is guided by cam roller 85 for reciprocal movement axially of the wire 9. The movable portion of the jaw 70 is mounted on movable jaw mounting 74 which opens the jaws 70 on the upward movement of the carriage 72. The movable jaw mounting 74 is mounted on carriage 72 on a guide member 75 slidably mounted by a bearing 76 on a slide rod 77 best illustrated in FIG. 6. As seen in FIG. 6, the guide member 75 for the movable jaw 70 is moved outwardly on the slide rod 77 against the force of a compressed coil spring 78. A slotted cam 79 on the guide member 75 engages a cam roller 80 on the carriage 72 to maintain the proper radial position of the guide member 75 on the rod 77.

Figure 5:
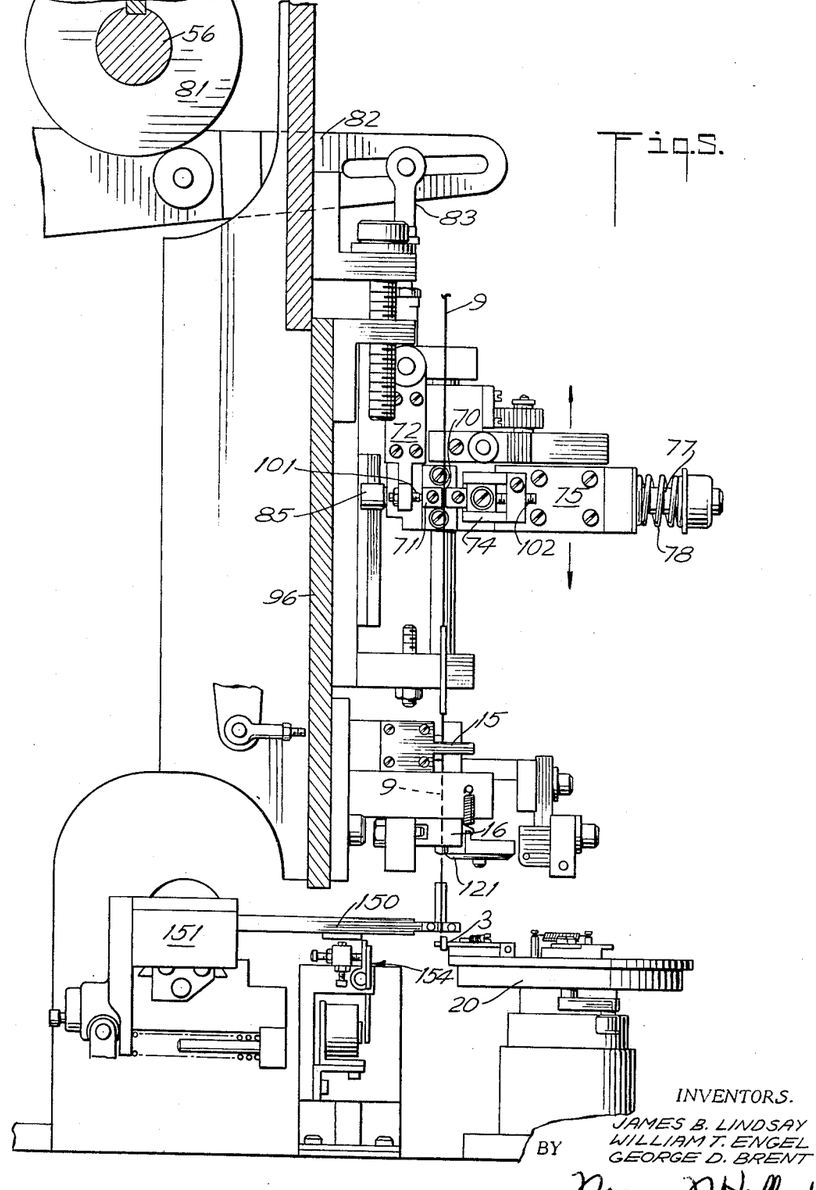
Figure 20:
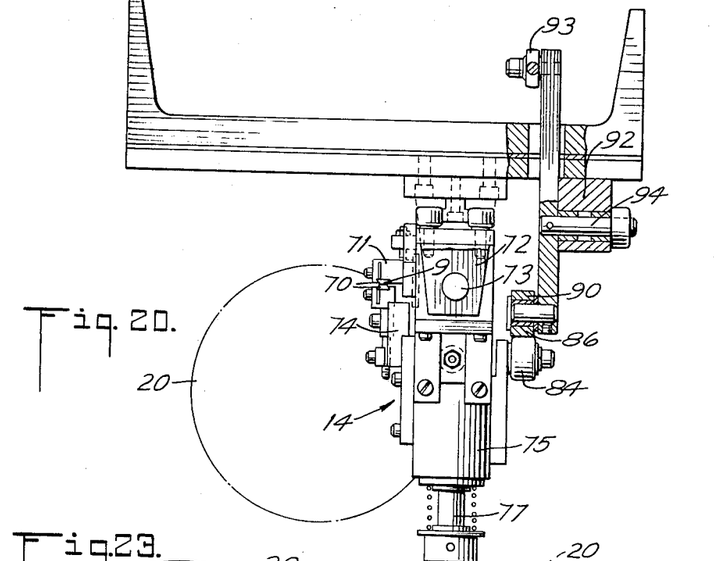
FIG. 20 is a horizontal sectional view of the wire feed means taken along line 20—20 on FIG. 3.

The carriage 72 is moved up and down on its guide shaft 73 by a drive means consisting of a cam 81 on the upper cam shaft 56 coupled to the carriage 72 as illustrated in FIGS. 5 and 6 by lever 82 and rod 83. As the rotating cam 81 moves the carriage downwardly 72 the jaws 70 are closed to advance the wire 9 and as the carriage 72 is then returned to its raised position the jaws 70 are opened to permit them to slide upwardly on the wire 9. The jaws 70 are opened by the outward movement of the movable jaw 70 together with its mounting 74 on the upward movement of the carriage 72 through the intermediation of a cam roller 84 riding on a generally vertical cam bar 86. As best illustrated in FIGS. 3 and 20 the cam bar 86 is moved towards and away from the face of the machine head 6 to engage the cam roller 84 on its upward movement by being mounted on a pair of link members 90 and 91 pivotally attached to a bracket 92 on the face of the machine head 6. The upper link member 90 has a drive portion extending into the head 6 as illustrated in FIG. 20 and which is coupled to a vertical drive rod 93. A rocking movement of this upper link 90 about its pivotal mounting 94 moves the cam bar 86 inwardly on the downward movement of the feed carriage 72 and moves the cam bar 86 outwardly to open the jaws 70 on the upward movement of the carriage 72. This rocking movement is provided by coupling the drive rod 93 through a suitable cam lever to a jaw timing cam 95 (FIG. 3) on the upper cam shaft 56.

In the preferred embodiment the mountings for the carriage support rod 73 and the cam bar bracket 92 are attached to a common mounting plate 96 which is adjustably connected, as illustrated in FIG. 3, by slots 97 and bolts 98 to the surface of the machine head 6 permitting the simultaneous vertical adjustment of these members under the control of an adjusting screw 99. This permits a fine adjustment to be made of the start and stop positions of the wire advance. The slotted connections between the carriage drive rod 83 and its associated cam lever 82 as illustrated in FIG. 6 permits the length of the advance to be adjusted by the adjustable positioning of the rod coupling to the slot 100. Both jaw members 70 are adjustably positioned on their own mountings 71 and 74 with their positions controlled by the adjusting screws 101 and 102 as illustrated in FIG. 5.

THE WIRE FEED CLAMP

In order to fix the position of the wire 9 and to hold it stationary after the wire 9 has been advanced by the wire feed 14 and during the return movement of the wire feed 14, a clamp 15 (FIG. 2) is positioned in the path of the wire 9 beneath the wire feed 14. The details of the clamp 15 are illustrated in the sectional view FIG. 22. A fixed jaw 103 is adjustably mounted on a bracket 104 attached to the mounting plate 96. A movable jaw 105 is slidably mounted in this bracket on a support rod 106 which normally holds the jaw 105 closed in engagement with the wire 9 under the force of the compressed coil spring 107 positioned between a nut 108 and a washer 109 on the rod 106. The jaw 105 is intermittently opened to permit the advance of the wire 9 by the wire feed 14 by the cam 110 (FIG. 3) mounted on the upper cam shaft 56 and coupled to the rod 106 through the intermediation of the crank 111, rod moving cam 112, and a suitable cam lever and coupling rod.

WIRE CUTTING KNIFE

As already described, the purpose of the wire feed 14 is to advance the wire 9 a predetermined distance. A wire cutting knife 16 is provided beyond the wire feed 14 and clamp 15 for severing off an end portion of the wire equal to the length of the wire advance. The knife 16 is mounted on the above described mounting plate 96 immediately beneath the clamp 15 as illustrated in FIGS. 3 and 5.

Figure 21:
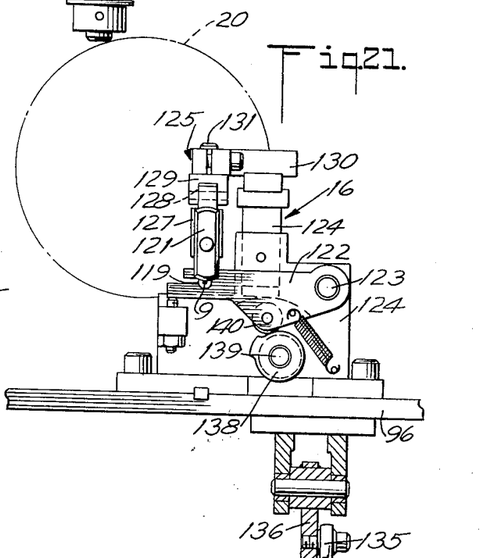
FIG. 21 is a horizontal sectional view of the wire cutter taken along line 21—21 on FIG. 6.
Figure 23:
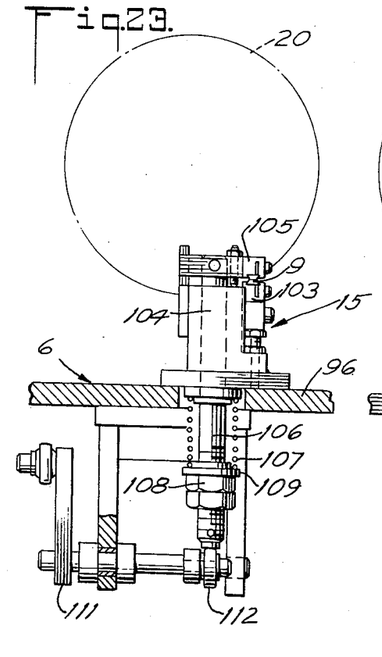
FIG. 23 is a detailed plan view of the wire clamp.

The details of the knife 16 are illustrated in FIGS. 6 and 21. The knife 16 includes a stationary die or apertured guide bearing 119 having a beveled lower surface 120 for presenting the wire 9 to the cutting edge of a knife blade 121. The die 120 is movably mounted on a bracket 122 pivoted at 123 to a support bracket 124 attached to the adjustable mounting plate 96. The knife blade 122, which remains stationary during the cutting operation, is adjustably connected to the bracket 124 by an adjustable support 125 which provides for the setting of the cutting angle of the knife edge to form diagonal cuts 2' (FIG. 23) on the wire 2 in a variety of adjustable directions. The angle is chosen to provide a wire 2 cut at an angle to its longitudinal axis for providing a sharp edge to facilitate the impact welding.

As seen in FIGS. 6 and 21, the knife blade support 125 includes a blade support 127 pivotally attached at 128 to an intermediate support member 129 which is itself rotatably connected to bracket 130 for adjustable rotation about its mounting pin 131. This permits the angle of the cut 2' to be adjustably set with respect to two axis at right angles to one another and in a plane perpendicular to the axis of the wire 9. The member 130 is in turn slidably and adjustably connected to bracket 124 to permit adjustment of the knife blade 121 in the direction of the arrow 132. The bracket 124 is split and coupled by a bolt 133 for adjusting its length. The wire 9 is cut at the proper time by cutting cam 134 on the upper cam shaft 56 (FIG. 3) through the intermediation of a suitable cam lever and connecting rod 135 which rotates the die support bracket 122 through the intermediation of cranks 136 and 137 and a cam 138 mounted on the bottom of crank shaft 139 and positioned to engage a cam roller 140 on the pivotally mounted die bracket 122.

THE WELDER

Figure 19:
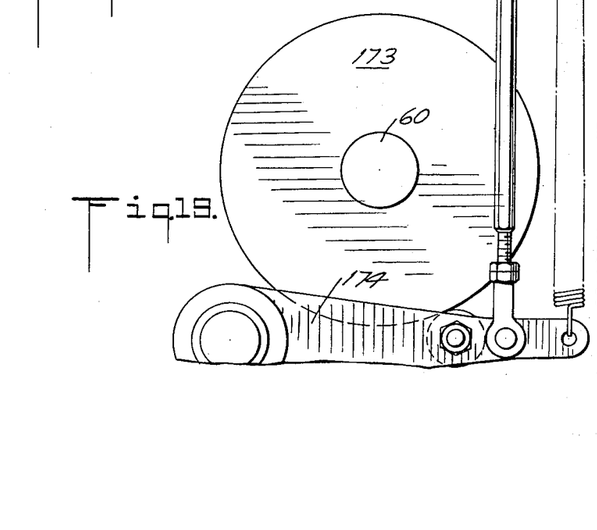
FIG. 19 is a vertical sectional view of the drive means for the impact device for the jaws.

As already indicated, at the welder 17 the short length of wire 2 which has been cut from the wire supply 9 at the cutter 16 is welded to a slug 3 or other element presented to the welder 17 by the rotating dial 20. The operation of the welder 17 will now be described generally with particular reference to FIG. 14. The short length of wire 2 is held between a pair of gripping jaws 150 mounted on a support arm 151 and with the wire 2 initially positioned a slight distance above a slug 3 in the dial 20. The percussive welding operation, as described above, is done during a sharp movement of the wire 2 downwardly against the slug 3. The welding current has already been switched to the welding jaws 150 while the welding arm 151 was resting on the latch 154. This current passes down through the wire 2 forming an arc with the slug 3. This arc is so proportioned that it blows away the point of the wire and leaves a molten end on the wire and a molten pocket in the slug. Since the wire is still approaching the slug at a rapid rate, the two molten sections are brought forcibly together. In order to provide this movement, the jaw support arm 151 is rotatably mounted in a bearing 152 on a support bracket 153. The jaw mounting arm 151 is rotated in the bearing 152 by a latching mechanism 154 (FIGS. 6 and 19) positioned beneath the jaw support arm 151 and which is unlatched at the proper instant to permit the jaws 150 to snap downwardly against the slug 3 with the desired impact or percussion. This latch 154 will be further described below.

In order to accomplish the above described welding action, it is also necessary for the jaws 150 to be opened at the completion of the weld to release the welded wire 2 and to remain open while the jaws 150 are swung upwardly and back to their initial position at which they again receive the lower end of the wire 9 to engage it and hold it during the above described cutting operation to form cut wire 2. The jaws 150 are opened and closed by a crank system 155 shown at the left-hand side of FIG. 12 and which is operated by a timing cam 156 on the lower cam shaft 60 as will be more fully described below.

Figure 16:
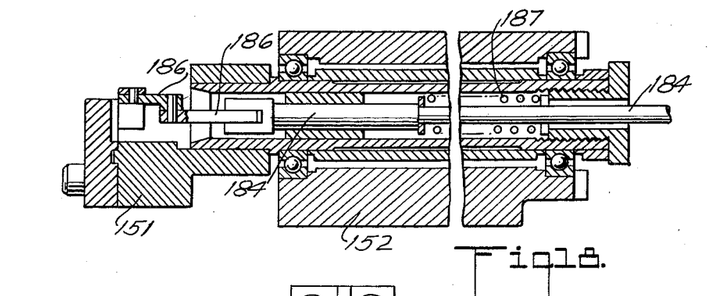
FIG. 16 is a horizontal sectional view of the welding jaws taken along line 16—16 on FIG. 6.

The latching mechanism 154 as well as the jaw support arm 151 are insulated from the remainder of the machine by using insulated washers and insulated spacers for various elements to assure that the welding current passes through the jaws and thence through the wire 2 during the welding cycle. The latching mechanism 154 for the welding jaws 150 is illustrated in detail in FIGS. 16 and 19. As seen in these figures, a latch block 160 is attached to the lower surface of the jaw support arm 151 and a release trigger 161 is pivotally mounted at 162 on a support bracket 163 in position to be swung in a counterclockwise direction (FIG. 19) by the attraction of an armature 164 by a solenoid 165. The downward impact force for swinging the welding jaws 150 down when the latch 154 is released by the solenoid 165 is provided by the compression coil spring 166 mounted between an adjustable tensioning bracket 167 and an arm 168 on the jaw support arm 151. The desired tension is provided in this spring by positioning the movable arm 169 on the tensioning bracket 167 through the intermediation of a positioning screw 170 by means of its connected control wheel 171. A suitable indicator 172 is provided on the bracket 167 to permit the tension adjustment to be observed, recorded, and reset as necessary. After the latch 154 has been released and the welding performed, the arm 151 is returned to its cocked position by a cocking mechanism controlled by a cam 173 (FIG. 19) on the lower cam shaft 60 and coupled to the jaw support arm 151 through the intermediation of a cam lever 174, connecting rod 175, and crank means 176 which has a roller 177 for engaging a cam surface 178 on the tensioning arm 168. The solenoid 165 is released by a suitable cam controlled switch system operated by a cam on one of the roller cam shafts and which also may be used to simultaneously apply the welding current by connecting the welding current source to the jaws 150.

Figures 12, 13, 14, 15:
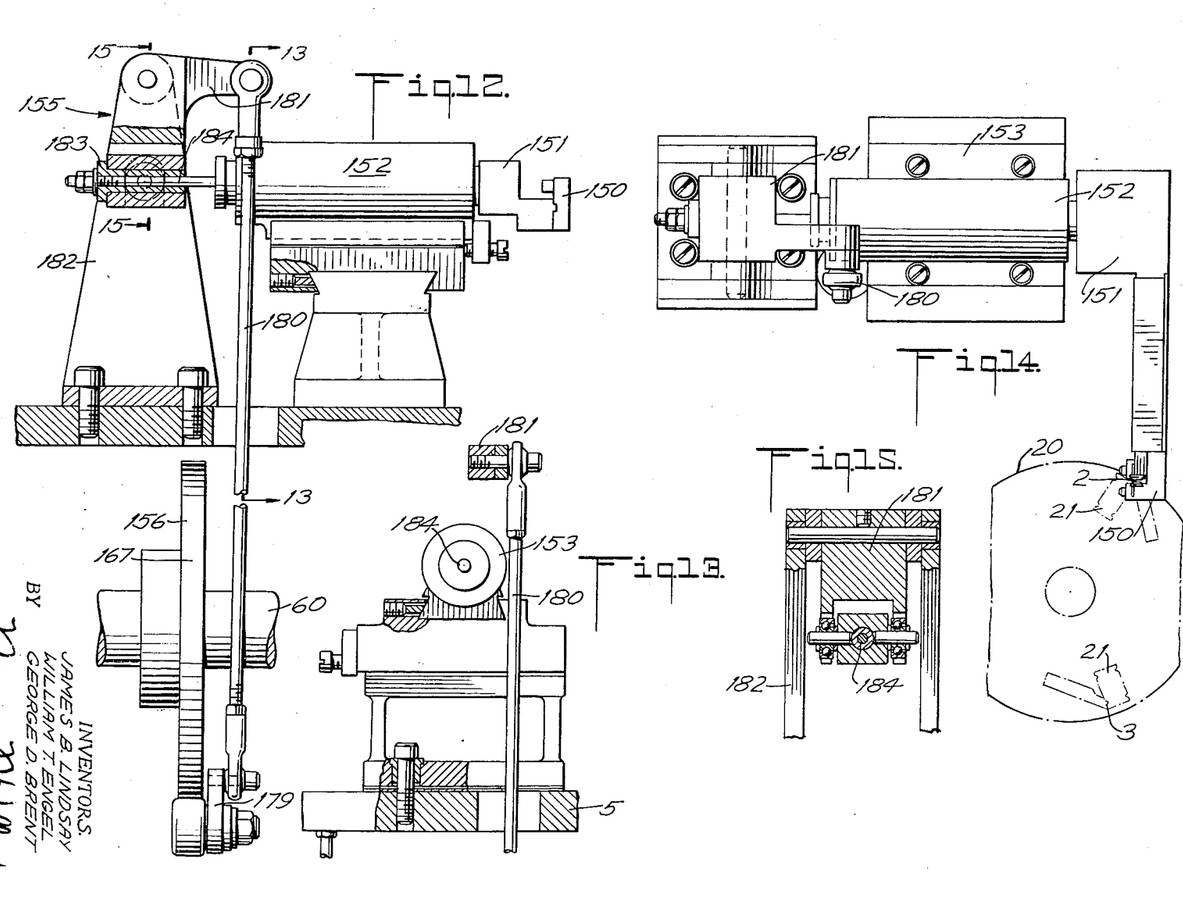
FIG. 12 is an enlarged detailed view partially in section of the welding jaws support and drive means.
FIG. 13 is a vertical sectional view of the welding jaws drive taken along line 13—13 on FIG. 12.
FIG. 14 is a top plan view of the welding jaws support and drive means.
FIG. 15 is a vertical sectional view of the welding jaws drive taken along line 15—15 on FIG. 12.
Figure 17:
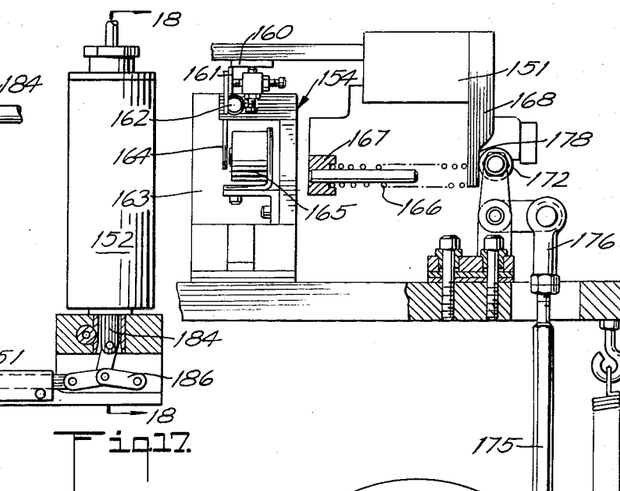
FIG. 17 is a top plan view partially in section of the jaw opening means.
Figure 18:
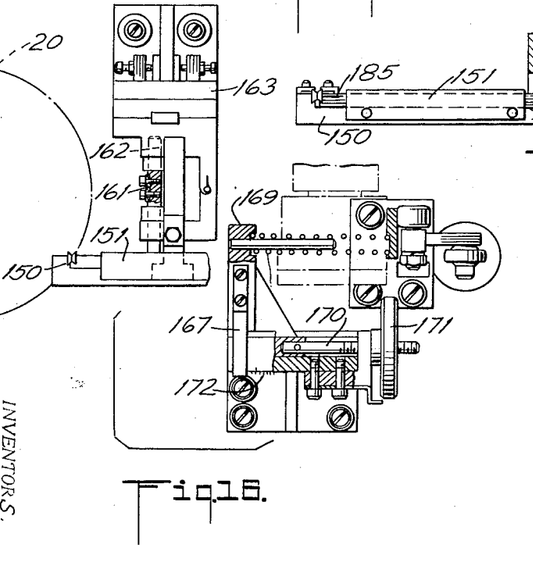
FIG. 18 is a vertical sectional view of the jaw opening means taken along line 18—18 on FIG. 17.

The jaws 150 are opened and closed to provide the above described welding action by the cam 167 on the lower cam shaft 60 as illustrated in FIG. 12. This cam 167 is coupled by a cam lever 179 and rod 180 to a control crank 181 mounted on a bracket 182 and having its lower end coupled by a suitable insulating bearing 183 to a jaw control rod 184 extending through the jaw mounting bearing 152. The details of the control rod 184 are illustrated in FIGS. 17 and 18. The control rod 184 is coupled, as seen in FIG. 17, to a movable jaw member 185 by a toggle coupling consisting of three pivotally connected links 186 positioned to move the movable jaw 185 between its open and closed positions through an axial movement of the control rod 184 against the compressed coil spring 187 which normally holds the jaws 150 in their closed position. When the jaws 150 are to be opened, the connecting rod 180 is moved downwardly by the control cam 156 causing the crank 181 to draw the jaw control rod 184 to the right, as seen in FIG. 18, compressing the coil spring 187 and moving the movable jaw 185 to the right through the intermediation of the toggle links 186.

Figures 22, 26:
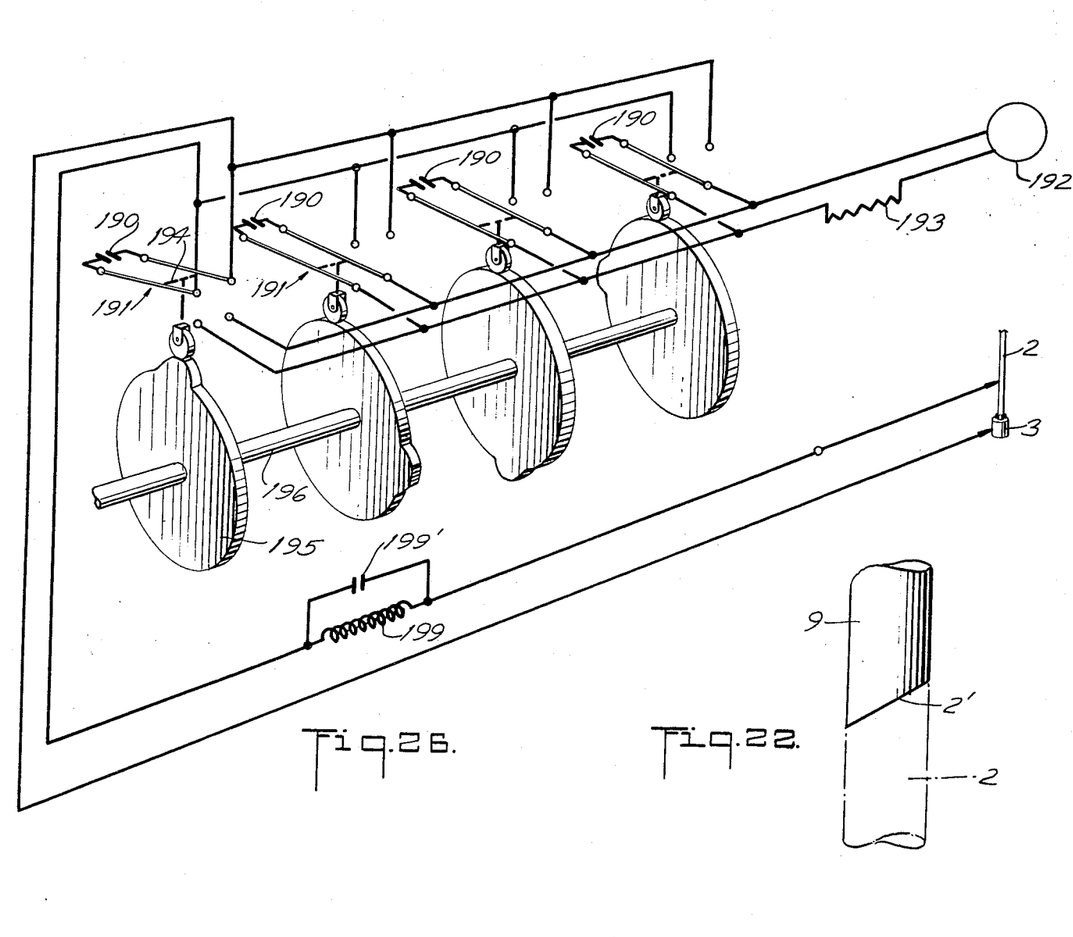
FIG. 22 is an enlarged detailed view of a cut wire.
FIG. 26 is a schematic diagram of the welding circuit.

A preferred electrical system for applying the pulse of welding current for the percussive welding operation is illustrated schematically in FIG. 26. The circuit includes capacitors 190 for storing the charge for providing the necessary high current welding discharge under the control of a timing circuit described below. In order to store a sufficiently high charge, it has been found desirable to use electrolytic capacitors which are capable of storing a relatively large charge in a capacitor having relatively small physical size. More effective operation in which complete charge is obtained at high welding rates and in which significantly longer capacitor life is experienced results from the preferred embodiment of the circuit as illustrated in which four separate capacitors 190 are used and in which the capacitors 190 are discharged in succession with each discharge providing for a separate and successive weld. Each of the individual capacitors 190 is coupled through a double pole double throw switch 191 to a source of direct current 192 fed to the capacitors through a resistor 193 which in the preferred embodiment has a relatively low value of about 10 ohms.

The switch arm 194 of each of the four switches 191 is mounted adjacent to a control cam 195 and these four control cams are mounted on a welding timing shaft 196 driven from the upper cam shaft 56 through the intermediation of sprockets 197 and chain 198 (FIG. 3) and with the sprockets 197 and connecting chain 198 arranged to turn the timing shaft 196 at one-quarter of the speed of the upper cam shaft 56. This permits each of the individual cams 195 to be shaped to connect its related capacitor 190 to a cut wire 2 and slug 3 for every fourth welding operation. The four cams 195 have welding activating projections spaced 90° from one another so that one revolution of the timing shaft 196 provides the welding currents at the proper interval and in succession for four successive cycles of the wire 9 and the dial 20 movement. As illustrated in FIG. 26 one of the contacts for each switch 191 is coupled to a slug 3 through a support chuck 21 on the dial 20 and the other contact is coupled to a cut wire 2 through the above described wire supporting jaws 150.

Improved welds have been found to result where a relatively low inductance is included in the welding circuit as illustrated at 199. An inductance of a few millihenrys has been found to provide excellent control. A preferred embodiment of this control coil, for example, has fifty-seven turns formed in three layers on about a 5/16 inch mandrel. Preferably, the current control inductance 199 is bridged by a capacitor 199' which may have a value of about 100 mfd. A typical value for the storage capacitors 190 is about 5,000 mfd. for welds of small cut wires 2 and slugs 3.

The above described circuit has been found to provide excellent welds with high weld strength even where the welds are made at relatively high speeds such as about 200 to 300 welds per minute.

THE FEED DIAL

As already indicated, the slugs 3 or other elements which are to be attached to the short lengths of wire 2 are advanced to the welder 17 at the welding station by a dial 20 rotatably mounted on the machine base 5 and intermittently stepped to present one of the spaced chucks 21 to the welding station.

As will be clear from the following description of the dial 20, the spaced chucks 21 which are arranged to grip the slugs 3 or a variety of other metal elements such as caps or cut wires and the like are readily adapatable for feeding one or another of these elements to the welding station by very simple adjustments. This makes the improved machine extremely useful as the high speed percussive welding operation may be used on a series of relatively short runs by the manufacturer to form a variety of two element objects. Simple changes in the chuck elements in the manner indicated below permit this rapid changeover. The preferred horizontal arrangement of the dial 20 and the vertical feed of the cut wire 2 or other element additionally adapts the apparatus both for the automatic feeding of the small elements as indicated or for use in a hand operation in situation where the small articles being fed by the dial 20 are changed from time to time to provide a variety of welded elements.

Figures 8, 11:
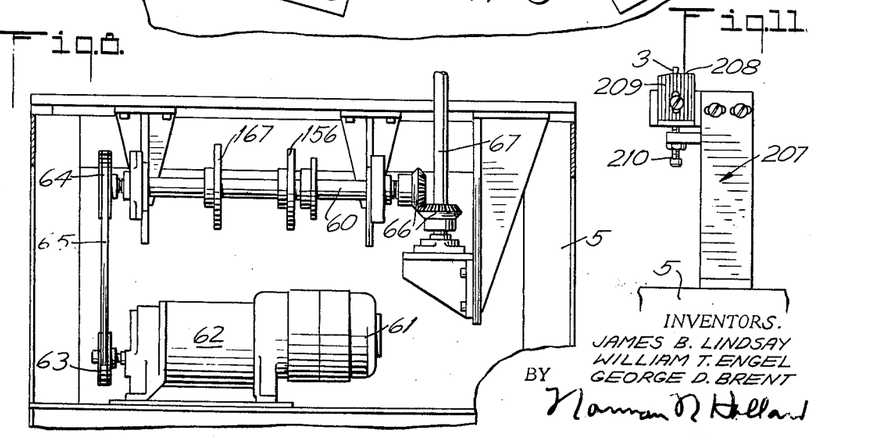
FIG. 11 is a fragmentary elevational view illustrating a slug or cap support member.
Figures 9, 10:
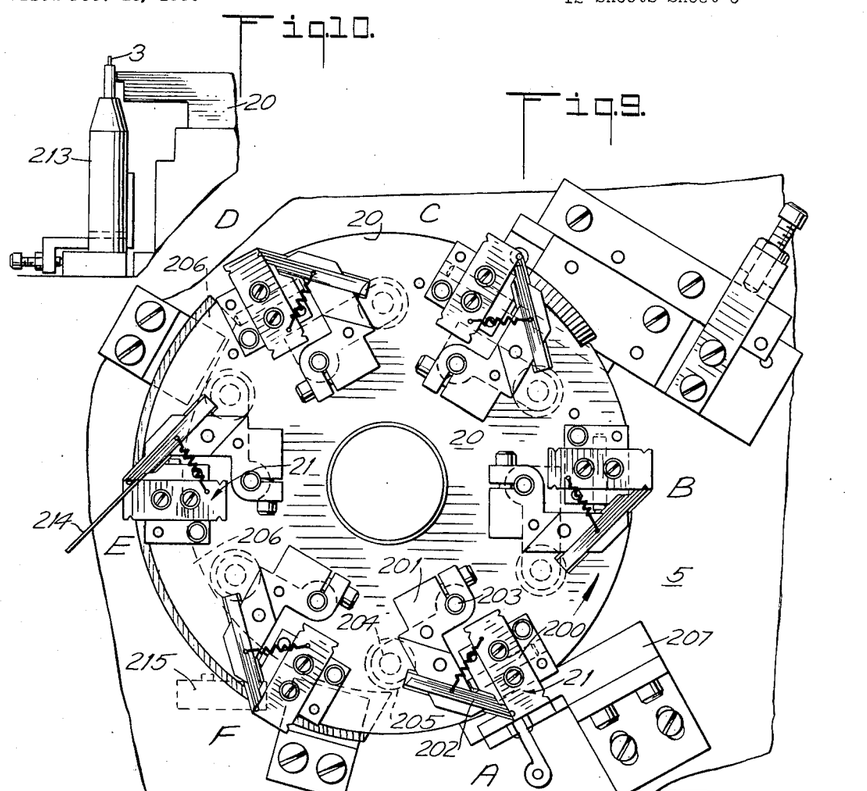
FIG. 9 is a detailed top elevational view of the slug or cap feed dial including the support chucks for the secondary elements.
FIG. 10 is a fragmentary side elevational view illustrating a chuck line up fixture.

The intermittent rotation of the dial 20 is provided by a conventional Geneva or Ferguson drive mounted in the machine base 5 and having a positive coupling to the drive motor 61 from cam shaft 60 or otherwise. The dial 20 is illustrated in detail in FIGS. 9, 10, and 11. As seen in FIG. 9, the dial 20 mounts a group of individual slug holding chucks 21. Each chuck 21 consists of a fixed jaw 200 attached to the dial 20 and a pivotally mounted jaw 201 including an adjustable and replaceable gripping element 202. The movable jaws 201 are attached by vertical shafts 203 about which they are pivoted to grip and to release the slugs 3. A crank member 204 attached to the mounting shaft 203 beneath the dial 20 includes a cam roller 205 which engages the arcuate opening cam 206 also mounted beneath the dial to swing the movable jaw 201 to their opened position during the period when the completed and welded articles 1 are unloaded and also to permit the loading of a slug 3 at the loading position A.

An adjustable platform 207 is provided at the loading position A. The upper surface 208 of a positioning bar 209 on the platform is adjustably positioned and angled by mounting screws 210 (FIG. 11) to engage the lower surface of a slug 3 being fed to the dial 20 from the hopper 18 through the supply tube 19 and under the control of a dial operated release latch 211. The jaw opening cam 206 is proportioned to hold the jaw 201 in an open posiiton as the slug 3 drops onto the surface 208 and to thereafter release and close the jaw 201 as the dial 20 is stepped to advance the next clamp 21 to the loading position A.

The welding operation is performed at position C in the manner described above. A further adjustment to precisely position the slug 3 is provided by an upwardly inclined platform cam 212 positioned to engage the lower surface of the slug 3 as the clamp 21 moves into the welding position. FIG. 10 illustrates a line-up fixture 213 which may be removably attached at the welding position C to initially assure a proper line-up of the clamp 21 to position each slug 3 directly beneath the lower end of the wire length 2 to assure precise positioning for the impact operation.

At position D, the clamps 21 are opened by the opening cam 206 and a wiper blade 214 directs the completed welded article 1 into a suitable receptacle or exit chute. At position F, the jaws are cleaned for the next cycle to remove any deposits or any other coatings formed as a result of the welding by a continuously rotating brush 215 which cleans the exposed surfaces of the clamp 21 as illustrated in FIG. 2.

It will be seen that an improved automatic stud welder has been provided to produce two-piece components such as lead wires or lead caps and the like. The machine is particularly adapted to provide a precise and strong weld for attaching a short length of wire to a slug or cap or other small article. In addition, the machine is designed to permit a rapid interchange of the two or more elements being attached and by simple adjustments to permit a rapid changeover where, for example, two component lead-wires may be produced in one run and a cap and lead wire or other article in subsequent runs.

In addition to this interchangeability, the improved machine and method provide an improved weld by permitting precise control of the welded elements and by providing improved control of the shape of the wire cuts and the formation, control and application of the welding current.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In an automatic percussive electric welding machine for attaching pointed portions of pieces of metal to other metal objects and including means for rapidly moving one of said pieces of metal towards one of said other metal objects at a welding station and for simultaneously coupling said one piece and said one object to a source of current the improvement which comprises feed means for attaching pointed portions of pieces of metal to other metal objects in spaced array and for presenting the objects successively to the welding station whereby the pointed portions of said pieces of metal are percussively welded to said metal objects by a welding arc formed between the pointed portion on one of said pieces of metal and one of said metal objects, said means for presenting said other metal objects comprising a dial, means for rotatably mounting said dial for stepped movement about a generally vertical axis, a plurality of adjustable chucks on said dial for releasably engaging a variety of said objects of differing shape, and said current source comprising a plurality of capacitors, means for charging said capacitors, and switch means for successively coupling individual capacitors for successive welds of said welded pieces of metal and other metal objects.

2. The machine as claimed in claim 1 in which said current source comprises an inductance in circuit between said capacitors and said welding station for shaping the pulse of welding current.

3. The machine as claimed in claim 1 in which said means for moving said pieces of metal to the welding station comprises means for feeding a metal wire of indeterminate length, means for intermittently advancing the wire, means for straightening the wire, means for cutting a length of wire from the end of the wire with a pointed end, and means at the welding station for advancing the cut length independently of and at a faster rate than the feeding rate of the indeterminate lentgh of wire.

4. The machine as claimed in claim 1 in which said chucks include replaceable jaw portions.

5. In a method of automatically welding pointed portions of pieces of metal to other metal objects and including rapidly moving one of said pieces of metal toward one of said other metal objects at a welding station and simultaneously coupling said one piece and said one object to a source of current the improvement which comprises simultaneously supporting a plurality of the other metal objects in spaced array and presenting the objects successively to the welding station whereby the pointed portion of said pieces of metal are percussively welded to said metal objects by a welding arc between the pointed portion on said one piece of metal and said one object, and providing the welding current by charging a plurality of capacitors and by thereafter discharging the capacitors individually for successive welds.

6. The method as claimed in claim 5 in which the step of moving said pieces of metal to the welding station comprises feeding a metal wire of indeterminate length, intermittently advancing the wire, straightening the wire, cutting a length of wire from the end of the wire with a pointed end, and advancing the cut length independently of and at a faster rate than the indeterminate length.

7. The method as claimed in claim 5 in which said plurality of capacitors are charged simultaneously and are discharged independently of one another for successive welds.

References Cited
UNITED STATES PATENTS

| | | | |
|---|---|---|---|
| 2,473,543 | 6/1949 | Randolph | 219—103 |
| 2,537,989 | 1/1951 | Graham. | |
| 2,814,715 | 11/1957 | Blackmer | 219—95 |
| 2,892,926 | 6/1959 | Riley et al. | 219—97 XR |
| 2,986,625 | 5/1961 | Houda et al. | 219—95 |
| 3,156,966 | 11/1964 | Houda et al. | 219—95 XR |
| 2,858,413 | 10/1958 | Gertz | 219—80 |
| 3,417,220 | 12/1968 | Merchant | 219—80 |

JOSEPH V. TRUHE, Primary Examiner

L. A. SCHUTZMAN, Assistant Examiner

U.S. Cl. X.R.

219—80, 111, 113, 159, 96, 103